United States Patent
Stadelmeier et al.

(10) Patent No.: US 9,048,911 B2
(45) Date of Patent: Jun. 2, 2015

(54) ALAMOUTI ENCODING AND DECODING (75) Inventors: Lothar Stadelmeier, Stuttgart (DE); Daniel Schneider, Stuttgart (DE)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 12/742,456

(22) PCT Filed: Nov. 6, 2008

(86) PCT No.: PCT/EP2008/009383
§ 371 (c)(1),
(2), (4) Date: Sep. 17, 2010

(87) PCT Pub. No.: WO2009/062630
PCT Pub. Date: May 22, 2009

(65) Prior Publication Data
US 2011/0019758 A1    Jan. 27, 2011

(30) Foreign Application Priority Data

Nov. 14, 2007  (EP) .................................... 07120694

(51) Int. Cl.
*H04B 7/02* (2006.01)
*H04L 1/02* (2006.01)
(Continued)

(52) U.S. Cl.
CPC ............ *H04B 7/0669* (2013.01); *H04B 7/0671* (2013.01); *H04B 7/068* (2013.01); *H04B 7/0871* (2013.01); *H04B 7/0885* (2013.01); *H04B 7/0888* (2013.01); *H04B 7/0894* (2013.01); *H04L 1/0606* (2013.01); *H04L 1/0643* (2013.01); *H04L 1/0668* (2013.01)

(58) Field of Classification Search
None
See application file for complete search history.

(56) References Cited

U.S. PATENT DOCUMENTS 6,181,749 B1   1/2001 Urabe et al.
6,542,556 B1 * 4/2003 Kuchi et al. ................... 375/299
(Continued)

FOREIGN PATENT DOCUMENTS

CN    1859068 A    11/2006
EP    0 913 958     5/1999
(Continued)

OTHER PUBLICATIONS

Office Action issued Aug. 2, 2011, in European Patent Application No. 07 120 694.0.

(Continued)

*Primary Examiner* — Shuwang Liu
*Assistant Examiner* — Gina McKie
(74) *Attorney, Agent, or Firm* — Oblon, McClelland, Maier & Neustadt, L.L.P.

(57) ABSTRACT

The present invention relates to a refinement of the Alamouti encoding scheme. The Alamouti scheme provides transmitting in a first period, the symbols S1 and S2 and in the next period the symbols—S2* and S1*, wherein S1* is the complex conjugate of S1. The symbols carrying the same information are transmitted on different paths to a receiver. If a disturbance occurs during the first period, the receiver may recover the symbol from symbol S1* in the second time period and vice versa. If no disturbance occurs, the receiver may use both symbols to further improve the transmission quality. An interleaver is provided to increase the transmission distance between redundant symbols, thereby causing the spread delay to be set to a value larger than the maximum length of typical channel disturbance in the communication channel.

28 Claims, 6 Drawing Sheets

(51) Int. Cl.
*H04B 7/06* (2006.01)
*H04B 7/08* (2006.01)
*H04L 1/06* (2006.01)

(56) References Cited

U.S. PATENT DOCUMENTS

| | | | |
|---|---|---|---|
| 7,336,719 B2 * | 2/2008 | Gore et al. | 375/267 |
| 8,238,463 B1 * | 8/2012 | Arslan et al. | 375/267 |
| 2002/0003774 A1 | 1/2002 | Wang et al. | |
| 2004/0047284 A1 * | 3/2004 | Eidson | 370/203 |
| 2004/0057530 A1 * | 3/2004 | Tarokh et al. | 375/267 |
| 2004/0116077 A1 | 6/2004 | Lee et al. | |
| 2004/0176051 A1 | 9/2004 | Papadimitriou et al. | |
| 2004/0190601 A1 | 9/2004 | Papadimitriou et al. | |
| 2006/0050770 A1 | 3/2006 | Wallace et al. | |
| 2006/0093061 A1 | 5/2006 | Chae et al. | |
| 2006/0093062 A1 | 5/2006 | Yun et al. | |
| 2006/0120272 A1 | 6/2006 | Wang et al. | |
| 2007/0109954 A1 * | 5/2007 | Pasanen et al. | 370/204 |
| 2007/0291638 A1 | 12/2007 | Chae et al. | |
| 2009/0041141 A1 | 2/2009 | Wang et al. | |
| 2009/0041142 A1 | 2/2009 | Wang et al. | |

FOREIGN PATENT DOCUMENTS

| | | |
|---|---|---|
| EP | 1 170 897 | 1/2002 |
| EP | 1 655 874 | 5/2006 |
| GB | 2 391 775 | 2/2004 |

OTHER PUBLICATIONS

Communication pursuant to Article 94(3) EPC issued Mar. 16, 2011, in European Patent Application No. 09 166 495.3-2411.

U.S. Appl. No. 13/058,281, filed Feb. 9, 2011, Schwager, et al.

Larsson&Stoica: "Space-Time Block Coding for Wireless Communications", Section 6.3 Space-Time Coding, XP-002482640, pp. 87-94 and 132-137, (May 2003).

Ferre, Pierre et al., "Enhanced Video Streaming over COFDM based Wireless LANs using combined Space Time Block Coding and Reed Solomon Concatenated Coding", IEEE, pp. 2642-2646, (2004).

Muruganathan, Siva et al., "Performance and Complexity Comparisons of Detection Schemes for Alamouti Coded OFDM Systems", Wireless, pp. 252-257, (Jul. 11-13, 2005).

Office Action issued Jun. 29, 2012, in Chinese Patent Application No. 200880116602.6 with English translation.

European Office Action issued Oct. 10, 2012, in Application No. 07/120 694.0-2411.

Combined Taiwanese Office Action and Search Report issued Apr. 23, 2014 in Patent Application No. 097142876 (with English language translation).

* cited by examiner

ALAMOUTI ENCODING AND DECODING

FIELD OF THE INVENTION

The present invention relates to the fields of transmit diversity, receive diversity and space-time block codes. The present invention especially relates to a method of transmitting data from a transmitter to a receiver connected by a communication channel, a transmitter, a receiver and a communication system comprising at least one transmitter and/or at least one receiver.

DESCRIPTION OF THE PRIOR ART

Alamouti encoding encodes two input symbols S1 and S2 into four output symbols S1, −S2*, S2, S1*, where the symbols are represented as complex values and * denotes complex conjugation. Originally, Alamouti encoding was described as a space-time encoding scheme but space-frequency Alamouti encoding is known too. The encoding can be described by a coding matrix $$S = \begin{pmatrix} S1 & -S2^* \\ S2 & S1^* \end{pmatrix}, \quad (0)$$

whereby rows correspond to space and columns correspond to time (space-time encoding) or frequency (space-frequency encoding). In the original (i.e. space-time) Alamouti encoding scheme, the symbols S1 and S2 are transmitted at a first time instant n over a first and a second transmit port, respectively. In the next time instant n+1, the symbols −S2* and S1* are transmitted over the first and the second transmit port, respectively. In case of space-frequency encoding, the symbols S1 and S2 are transmitted on a first subcarrier n and the symbols −S2* and S1* are transmitted on a second, neighboring subcarrier n+1. For decoding, it is assumed that the channel conditions are the same for the times n and n+1 (in case of space-time encoding) or that the channel conditions are the same for the subcarriers n and n+1 (in case of space-frequency encoding). Since the columns of the coding matrix S are orthogonal, Alamouti encoding belongs to the class of orthogonal codes, which allows for a simple decoding. The spatial coderate $r_s$ of Alamouti encoding is 1.

Figure 1:
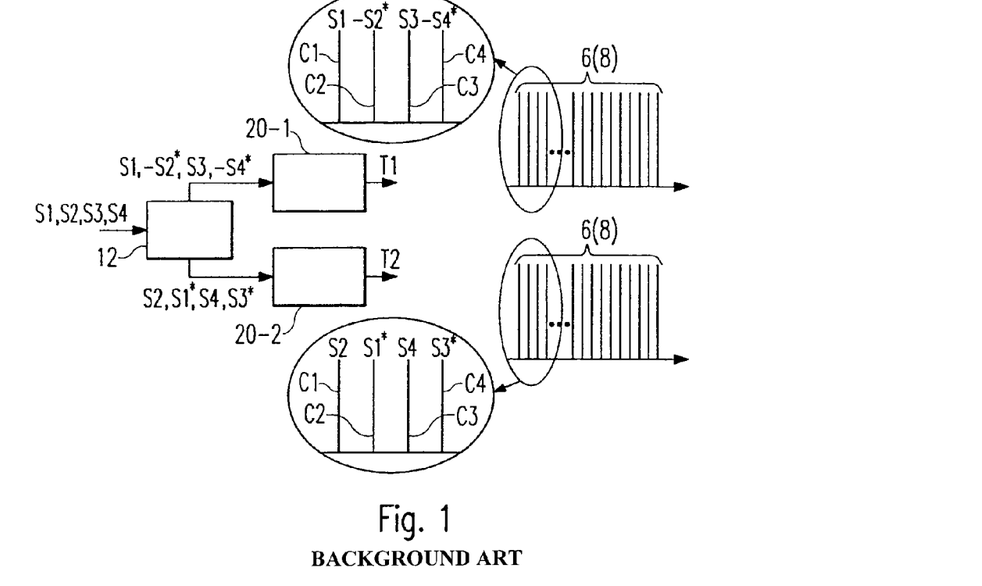
FIG. 1 shows OFDM Alamouti encoding according to the prior art.

FIG. 1 shows state of the art OFDM Alamouti encoding, as is employed, for example in, wireless communication systems. An Alamouti encoder 12 generates four output symbols S1, −S2*, S2 and S1* from two input symbols S1 and S2. The output symbols S1 and S1* are mutually redundant (i.e. comprise the same information). The output symbols S2 and −S2* are mutually redundant (i.e. comprise the same information). The output symbols S1 and −S2* are input to a first OFDM modulator 20-1 connected to a first transmission path T1 and the symbols S2, S1* are input to a second OFDM modulator 20-2 connected to a second transmission path T2. OFDM modulation uses a plurality of orthogonal subcarriers 8 of different frequency f to transmit a plurality of data symbols concurrently. The plurality of symbols that are transmitted concurrently together correspond to an OFDM symbol 6. The first OFDM modulator 20-1 modulates a first subcarrier C1 based on the symbol S1 and a second subcarrier C2 based on the symbol −S2*. In the same way, the second OFDM modulator 20-2 modulates the first subcarrier C1 based on the symbol S2 and the second subcarrier C2 based on the symbol S1*. Thus, the symbols S1 and −S2* are transmitted in the form of modulated subcarriers C1 and C2 on the transmission path T1 and the symbols S2 and S1* are transmitted in the form of modulated subcarriers C1 and C2 on the transmission path T2. The symbols S1, −S2*, S2 and S1* are said to be transmitted or carried on or by the subcarriers 8. The symbols S1, −S2*, S2 and S1* are transmitted at the same time.

FIG. 1 shows further two input symbols S3 and S4 from which four further output symbols S3, −S4*, S4, S3* are generated, which are carried by a third and a fourth subcarrier C3 and C4 of the subcarriers 8 in the same way as the symbols S1, −S2*, S2 and S1* are carried by the subcarriers C1 and C2. Thus, an incoming pair of input symbols is pairwise encoded by the Alamouti encoder 12.

When the input symbols S1 and S2 are encoded according to the state of the art and a noise burst or other perturbation disturbs the communication channel between a transmitter and a receiver during the transmission of the encoded input symbols, the input symbols S1 and S2 can not be decoded successfully.

In a PLC (Power Line Communication) channel, for example, the impedance is stable for a long time (the PLC channel is quasi static). However, impedance modulating devices change the channel suddenly and periodically between discrete impedances, related to the line cycle duty (50/60 Hz).

Figure 2:
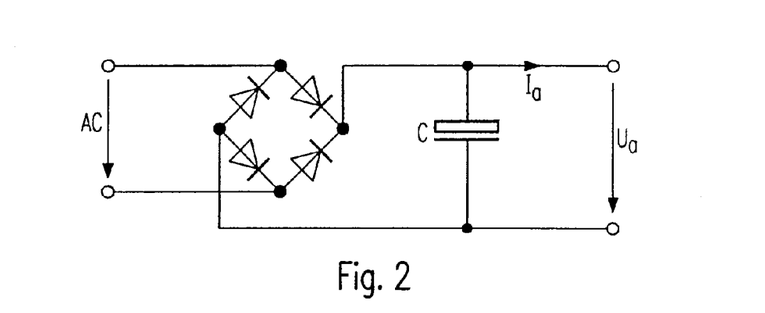
FIG. 2 shows an example of an impedance modulating device.

FIG. 2 shows a rectifier, which is an example of an impedance modulating device. AC denotes the mains line. $I_a$ denotes a current and $U_a$ denotes a voltage.

Figure 3:
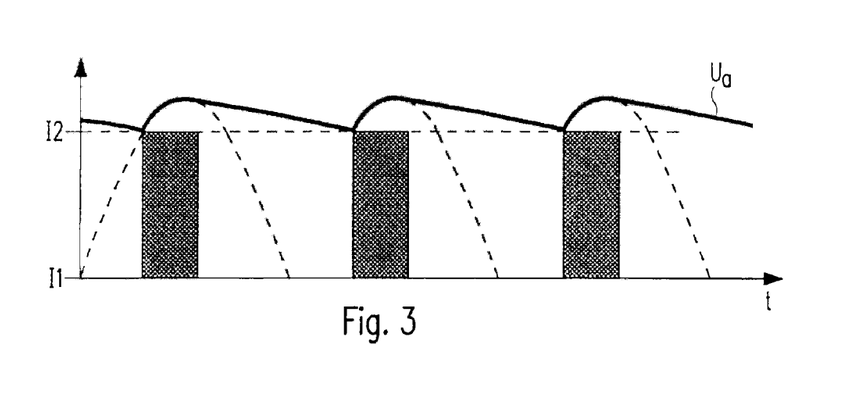
FIG. 3 shows an example of a discrete time varying impedance.

FIG. 3 shows a diagram of the Voltage $U_a$ and the impedance I over time t. When the capacity C charges, HF signals from mains are shortcut. On the other hand, when the diodes are blocking, the rectifier has a high input impedance. As a result, the mains impedance I changes every 10 or 20 msec (depending on the line cycle duration) between a first value I1 and a second value I2.

Therefore, if state of the art OFDM Alamouti encoding as described above in relation to FIG. 1 were used for PLC systems, an impedance change during an OFDM burst would result in wrong channel equalization values after the impedance change and thereby cause transmission errors.

The problem to be solved by the present invention is to provide for a method of transmitting data from a transmitter to a receiver connected by a communication channel, an transmitter, a receiver and a communication system with improved reliability of data transmission.

BRIEF DESCRIPTION OF THE PRESENT INVENTION

This problem is solved by a transmitter for transmitting on a first transmit path and on a second transmit path comprising an encoder adapted to encode two input symbols into four output symbols, whereby a first symbol and a fourth symbol of said four output symbols carry the same information and a second symbol and a third symbol of said four output symbols carry the same information, said first symbol is transmitted on said first transmit path during a first transmission period, said second symbol is transmitted on said second transmit path during said first transmission period, said third symbol is transmitted on said first transmit path during a second transmission period, said fourth symbol is transmitted on said second transmit path during said second transmission period, said first and second transmit paths correspond to input paths of a communication channel, a spread delay is a number of transmission periods between said first transmission period and said second transmission period and said spread delay is larger than a maximum length of channel disturbances of the communication channel.

Using a spread delay that is larger than a maximum length of noise bursts of the communication channel guarantees that the redundancy of the encoded data can be used to recover the input symbols in the presence of noise bursts.

Advantageously, said two input symbols are encoded into said four output symbols according to an Alamouti encoding.

Advantageously, said first, second, third and fourth symbol are transmitted on OFDM subcarriers of the same frequency. In this case, the amount of information that is transmitted on each OFDM subcarrier during one transmission period is advantageously varied adaptively according to channel conditions. Alternatively, said first and fourth symbols are transmitted on OFDM subcarriers of different frequencies and said second and third symbols are transmitted on OFDM subcarriers of different frequencies. In this case, the amount of information that is transmitted on an OFDM subcarrier during one transmission period advantageously is the same for different transmission periods. Also advantageously in this case, the amount of information that is transmitted on an OFDM subcarrier during one transmission period is the same for all subcarriers.

Advantageously, the spread delay is variable.

Advantageously, the transmitter is adapted to receive information indicating the spread delay to be used from a receiver of the output symbols. Alternatively, the transmitter advantageously comprises a channel estimator adapted to determine the maximum length of the channel disturbances.

Advantageously, the spread delay is more or equal than two.

Alternatively and advantageously, the transmitter is a terrestrial DVB transmitter and the spread delay is one.

This problem is further solved by a receiver for receiving one or more first signals during a first transmission period and for receiving one or more second signals during a second transmission period, the one or more first signals being based on a first symbol transmitted on a first transmit path during said first transmission period and a second symbol transmitted on a second transmit path during said first transmission period, the one or more second signals being based on a third symbol transmitted on said first transmit path during said second transmission period and a fourth symbol transmitted on said second transmit path during said second transmission period, whereby said first symbol and said fourth symbol carry the same information, said second symbol and said third symbol carry the same information, the information carried by each of said first and forth symbols corresponds to a first input symbol and the information carried by each of said second and third symbols corresponds to a second input symbol, the receiver comprising a decoder adapted to decode the two input symbols based on said one or more first signals and/or is adapted to decode said two input symbols based on said one or more second signals.

By being able to decode the input symbols from the one or more first signals alone (i.e. without requiring the one or more second signals), the input symbols can be decoded even in case the one or more second signals have been disturbed/destroyed. Similarly, by being able to decode the input symbols from the one or more second signals alone (i.e. without requiring the one or more first signals), the input symbols can be decoded even in case the one or more first signals have been disturbed/destroyed.

Advantageously, said decoder is further adapted to decode said two input symbols based on said one or more first signals and said one or more second signals. In this case, the receiver advantageously comprises a channel estimator adapted to determine if said one or more first signals are transmitted correctly or not and if said one or more second signals are transmitted correctly or not, whereby, in case that said one or more first signals and said one or more second signals are determined to be transmitted correctly, said decoder decodes said two input symbols based on said one or more first signals and said one or more second signals. Advantageously, in case that said one or more second signals are determined to be transmitted incorrectly, said decoder is adapted to decode said two input symbols based on said one or more first signals.

Advantageously, said first symbol is transmitted as part of a first OFDM symbol, said second symbol is transmitted as part of a second OFDM symbol, said third symbol is transmitted as part of a third OFDM symbol and said fourth symbol is transmitted as part of a fourth OFDM symbol, whereby said channel estimator is adapted to determine if said one or more first signals are transmitted correctly or not and if said one or more second signals are transmitted correctly or not based on pilot signals comprised in the OFDM symbols transmitted during said first and second transmission period, respectively. In this case, said channel estimator advantageously is adapted to determine if said one or more first signals are transmitted correctly or not and if said one or more second signals are transmitted correctly or not based on determining if the pilot signals are in accordance with stored equalizer settings.

Advantageously, a spread delay is a number of transmission periods between said first transmission period and said second transmission period and the spread delay is variable. Advantageously in this case, said channel estimator is adapted to determine the spread delay that shall be used by said transmitter based on channel conditions. Alternatively advantageous in this case, said receiver is adapted to receive information indicating the spread delay from the transmitter.

Alternatively, a spread delay is a number of transmission periods between said first transmission period and said second transmission period whereby the spread delay advantageously is more or equal than two.

Alternatively and advantageously, the receiver is a terrestrial DVB receiver, a spread delay is a number of transmission periods between said first transmission period and said second transmission period and said spread delay is one.

This problem further solved by a communication system comprising at least one transmitter according to the present invention and/or at least one receiver according to the present invention.

This problem is further solved by a method of transmitting data from a transmitter to a receiver connected by a communication channel comprising the steps of encoding two input symbols into four output symbols, whereby a first symbol and a fourth symbol of the four output symbols carry the same information and a second symbol and a third symbol of said four output symbols carry the same information, transmitting said first symbol on a first input path of said communication channel during a first transmission period, transmitting said second symbol on a second input path of said communication channel during said first transmission period, transmitting said third symbol on said first input path during a second transmission period and transmitting said fourth symbol on said second input path during said second transmission period, receiving one or more first signals during said first transmission period and one or more second signals during said second transmission period on one or more output paths of said communication channel, the method comprising either the step of decoding said two input symbols based on said one or more first signals or the step of decoding said two input symbols based on said one or more second signals.

By decoding the input symbols from the one or more first signals alone (i.e. without requiring the one or more second signals), the input symbols can be decoded even in case the one or more second signals have been disturbed/destroyed. Similarly, by decoding the input symbols from the one or more second signals alone (i.e. without requiring the one or more first signals), the input symbols can be decoded even in case the one or more first signals have been disturbed/destroyed.

Advantageously, said two input symbols are encoded into said four output symbols according to an Alamouti encoding.

Advantageously, the method comprises a step of determining if said one or more first signals are transmitted correctly or not and if said one or more second signals are transmitted correctly or not and comprises a step of decoding said two input symbols based on said one or more first signals and said one or more second signals in case that said one or more first signals and said one or more second signals are determined to be transmitted correctly.

Advantageously, the method comprises a step of decoding said two input symbols based on said one or more first signals in case that said one or more second signals are determined to be transmitted incorrectly.

Advantageously, said first symbol is transmitted as part of a first OFDM symbol, said second symbol is transmitted as part of a second OFDM symbol, said third symbol is transmitted as part of a third OFDM symbol, said fourth symbol is transmitted as part of a fourth OFDM symbol, whereby said step of determining if said one or more first signals are transmitted correctly or not and if said one or more second signals are transmitted correctly or not is based on pilot signals comprised in the OFDM symbols transmitted during said first and said second transmission period. In this case, said step of determining if the one or more first signals are transmitted correctly or not and if said one or more second signals are transmitted correctly or not advantageously is based on determining if the pilot signals are in accordance with stored equalizer settings.

Advantageously, a spread delay is a number of transmission periods between said first transmission period and said second transmission period and said spread delay is variable. In this case, the method advantageously comprises the steps of automatically determining channel conditions of the communication channel and automatically determining the spread delay that shall be used by the transmitter based on the determined channel conditions.

Alternatively advantageous, a spread delay is a number of transmission periods between said first transmission period and said second transmission period and the spread delay is more or equal than two.

Alternatively and advantageously, the transmitter and the receiver are terrestrial DVB devices, a spread delay is a number of transmission periods between said first transmission period and said second transmission period and the spread delay is one.

Advantageously, a spread delay is a number of transmission periods between said first transmission period and said second transmission period and said spread delay is larger than a maximum length of channel disturbances of the communication channel.

DESCRIPTION OF THE PREFERRED EMBODIMENTS

Figure 4:
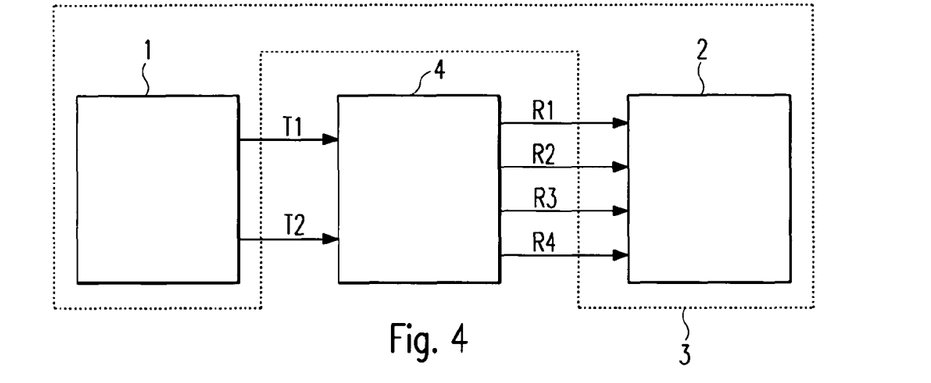
FIG. 4 shows a block diagram of a communication system according to the first embodiment of the present invention.

FIG. 4 shows first embodiments of the transmitter 1, the receiver 2 and the communication system 3 according to the present invention. The communication system 3 comprises the transmitter 1 and the receiver 2. More than one transmitter 1 and more than one receiver 2, although possible, are, for the sake of clarity, not shown in FIG. 4. Data is transmitted from the transmitter 1 to the receiver 2 via a communication channel 4 having two input (or transmit) paths T1 and T2 and at least one output (or receive) path R1, R2, R3 and R4. The transmitter 1 and the receiver 2 of the present embodiment may, for example, be PLC devices and the communication channel 4 may, for example, be formed mainly by conducting wires of a mains power system. PLC systems normally use two to four receive paths, but, generally, the present invention can be employed with any number of receive paths equal to or more than one. In case of four receive paths, the channel 4 is represented by a complex channel matrix $$H = \begin{pmatrix} h_{11} h_{12} \\ h_{21} h_{22} \\ h_{31} h_{32} \\ h_{41} h_{42} \end{pmatrix} \quad (1)$$

whereby the lines correspond to the receive paths R1, R2, R3, R4 and the columns correspond to the transmit paths T1, T2.

Figure 5:
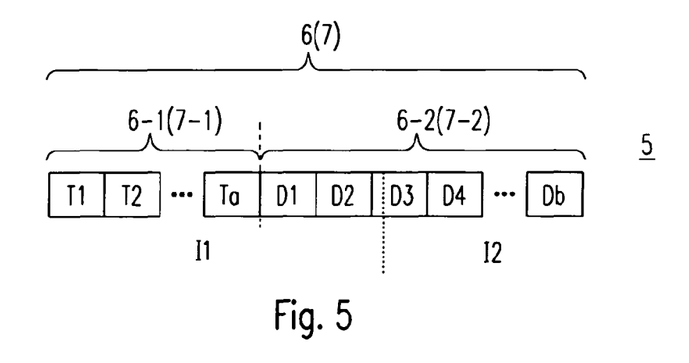
FIG. 5 shows the structure of an OFDM burst and a discrete time varying impedance.

FIG. 5 shows the structure of an OFDM burst 5 as is transmitted on each of the transmit paths T1, T2 by the transmitter 1. Each OFDM burst 5 comprises a time series of OFDM symbols 6. To each OFDM symbol 6 there is a corresponding OFDM symbol period 7. The length of the symbol period 7 is the same for all OFDM symbols 6. The OFDM symbols 6 comprise a training symbols 6-1 labeled T1 to Ta and b data symbols 6-2 labeled D1 to Db, with corresponding OFDM training symbol periods 7-1 and OFDM data symbol periods 7-2. The OFDM training symbols 6-1 are used by the receiver 2 for synchronization, calculation of equalization values and evaluation of the channel conditions including determination of a signal noise ratio (SNR) for each subcarrier. The OFDM data symbol periods 7-2 are indexed by a variable n. The index n counts the OFDM data symbol periods 7-2 (and the corresponding OFDM data symbol 6-2) over different OFDM bursts 5. Thus, if n=b corresponds to the last data symbol period 7-2 of a given OFDM burst 5, then n=b+1 corresponds to the first data symbol period 7-2 of the following OFDM burst 5. The OFDM bursts 5 are transmitted concurrently on each transmit path T1, T2. Thus, for every OFDM symbol period 7 there is a corresponding OFDM symbol 6 transmitted on the first transmit path T1 and a corresponding OFDM symbol 6 transmitted on the second transmit path T2. Each OFDM symbol 6 that is received during a given OFDM symbol period 7 on a given receive path corresponds to a mixture of the two OFDM symbols 6 that are transmitted during the given OFDM symbol period 7 on the transmit paths T1, T2. Of course, the time of transmission and time of reception differ by the time the signal (the OFDM symbols 6) travels. The notion 'OFDM symbol' 6 is also employed for the plurality of OFDM symbols 6 that are transmitted on the plurality of transmit paths T1, T2 or received on the plurality or receive paths R1, R2, R3, R4 during an OFDM symbol period 7.

Figure 6:
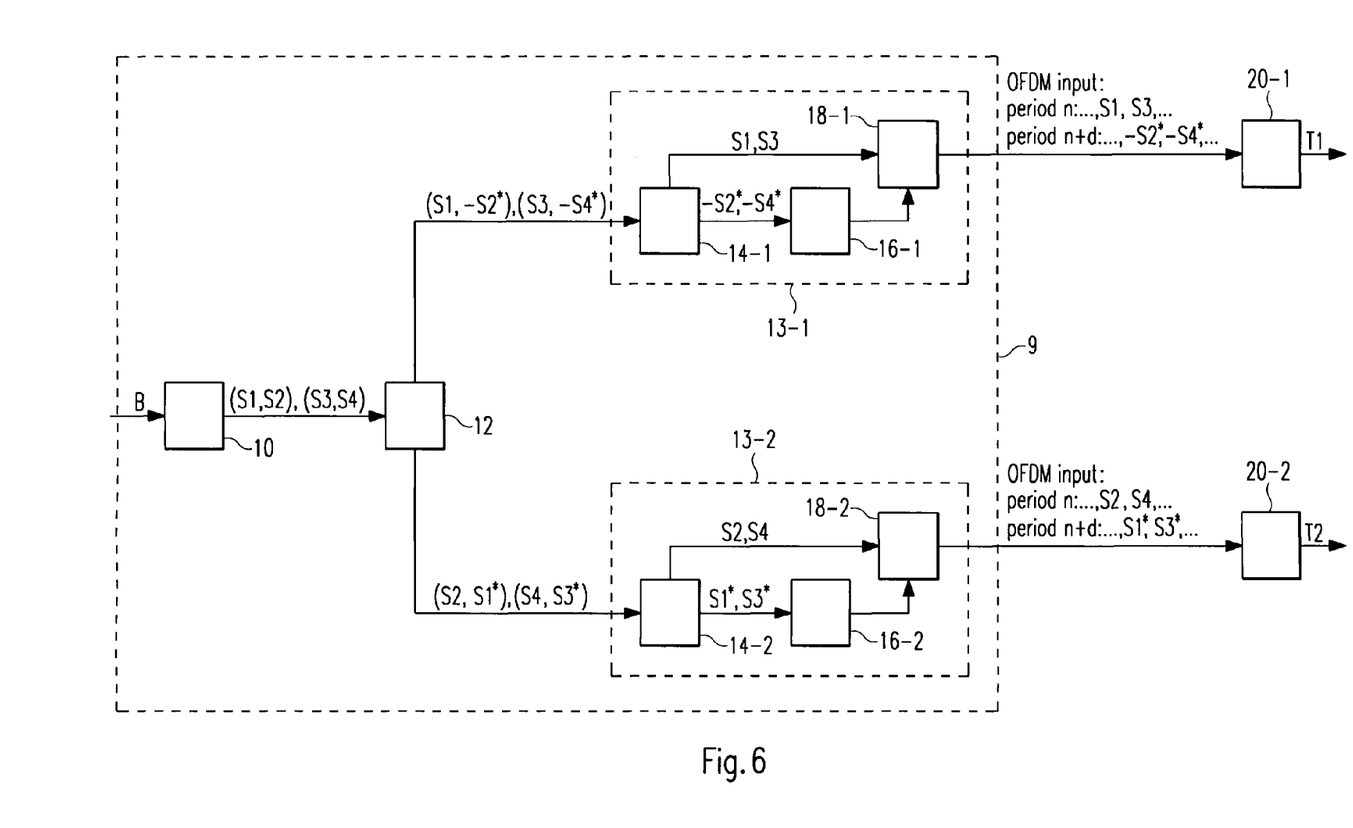
FIG. 6 shows a transmitter according to the first embodiment of the present invention.

FIG. 6 shows a block diagram of the transmitter 1 having two transmit paths T1 and T2. The transmitter 1 comprises an Alamouti encoder 12 and two OFDM modulators 20-1, 20-2 which are same as the Alamouti encoders 12 and OFDM modulators 20-1, 20-2 used in the state of the art Alamouti OFDM encoding described in relation with FIG. 1. However, a first interleaver 13-1 is inserted into the signal path from the Alamouti encoder 12 to the first OFDM transmitter 20-1 and a second interleaver 13-2 is inserted into the signal path from the Alamouti encoder 12 to the second OFDM modulator 20-2. The signal path bifurcates at the Alamouti encoder 12 into a first signal path comprising the first interleaver 13-1 and the first OFDM modulator 20-1 and a second signal path comprising the second interleaver 13-2 and the second OFDM modulator 20-2. Even if not explicitly said in the following, corresponding elements (e.g. the interleaver 13-1 and the interleaver 13-2) of the first and second signal paths have the same functionality. In the state of the art Alamouti OFDM encoding described above, the two output symbols of each signal path are mapped on subcarriers 8 of the same OFDM symbol 6. The interleavers 13 reorder the data streams from the Alamouti encoder 12 to the OFDM modulators 20 so that the two output symbols of each signal path are mapped on subcarriers 8 of different OFDM symbols 6.

The transmitter comprises a QAM modulator 10, which receives a bitstream B and generates data symbols S1, S2, S3, S4, . . . by a process of constellation mapping. Hereby, the symbols are ordered in pairs (S1, S2), (S3, S4), . . . and both symbols of a pair (e.g. S1 and S2) are encoded using the same constellation, and thus, carry the same amount of information. The symbols of different pairs (e.g. S1 and S3) however may be encoded using a different constellation, and thus, may carry a different amount of information. The constellation is selected according to the signal to noise ratio of each subcarrier 8. Thus, different constellations may be used for different subcarriers 8. The signal to noise ratio and the constellation may be determined more than once (repeatedly) for each subcarrier. Thus, the constellation may vary with time. The constellation to use may, for example, be indicated in a signal received from the receiver 2 (which performs channel quality measurements and determines the signal to noise ratios) via a feedback communication channel (not shown). This technique of variable constellation is known as adaptive OFDM.

The pairs of data symbols are fed into the Alamouti encoder 12, whereby, in the following, the pair S1, S2 is used as an example. The Alamouti encoder 12 generates four output symbols S1, −S2*, S2, S1* from the input pair S1, S2 and puts the symbols S1 and −S2* in this order on the first signal path and the symbols S2 and S1* in this order on the second signal path.

Figure 7:
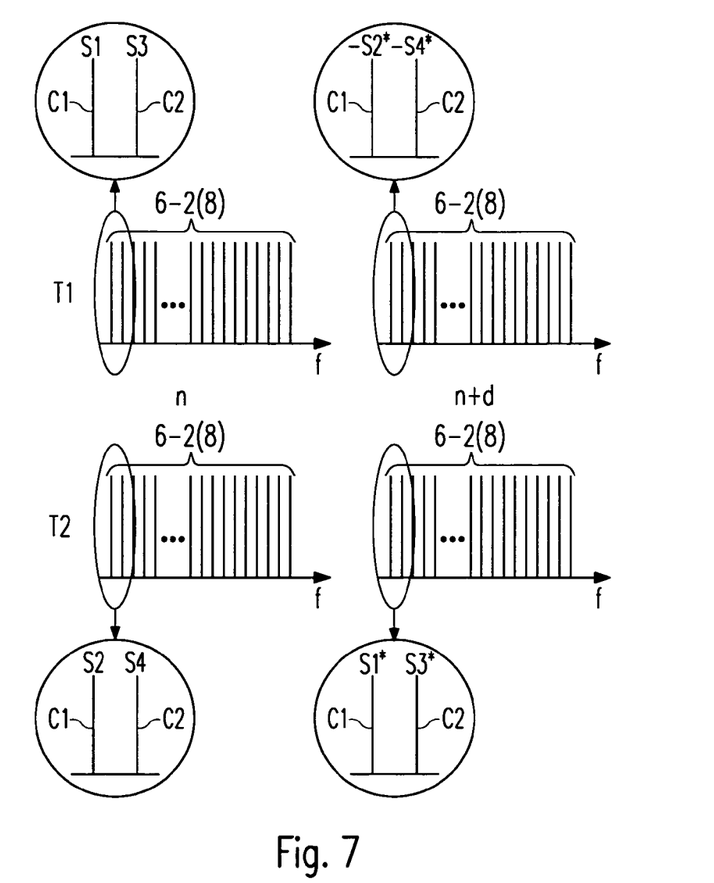
FIG. 7 shows the encoding used according to the first embodiment of the present invention.

FIG. 7 is a representation of the encoding used by the first embodiment of the present invention. Shown are four OFDM data symbols 6-2 pictured as subcarriers 8. The upper two OFDM data symbols 6-2 are transmitted on the first transmit path T1 and the lower two symbols 6 are transmitted on the second transmit path T2. The two OFDM data symbols 6-2 on the left are transmitted during a first OFDM data symbol period n and the two OFDM data symbols 6-2 on the right are transmitted during a second OFDM data symbol period n+d, which is the d-th data symbol period after the n-th OFDM data symbol period. The symbols of each mutually redundant symbol pair are transmitted using different OFDM symbol periods 7-2. S1 and S1* are transmitted during different OFDM data symbol periods n and n+d, respectively. The symbols S2 and −S2* are transmitted during different OFDM data symbol periods n and n+d, respectively. Therefore, even when a channel disturbance occurs during the data symbol period n (which destroys the output symbol S1 and/or S2), the input symbols S1 and S2 can be decoded from the OFDM data symbols 6-2 transmitted during the data symbol period n+d, which comprise information corresponding to the redundant output symbols S1* and S2*. In the same way, when a channel disturbance occurs during the data symbol period n+d (which destroys the output symbol −S1* and/or S2*), the input symbols S1 and S2 can be decoded from OFDM data symbols 6-2 transmitted during the data symbol period n, which comprise information corresponding to the output symbol S1 and S2.

The OFDM data symbol 6-2 transmitted first (i.e. the symbol 6-2 transmitted during the n-th OFDM data symbol period 7-2) is called an OFDM data symbol 6-2 of the first type or simply 'first OFDM data symbol' 6-2. The OFDM data symbol 6-2 transmitted second (i.e. the symbol 6-2 transmitted during the (n+d)-th OFDM data symbol period 7-2) is called an OFDM data symbol 6-2 of the second type or simply 'second OFDM data symbol' 6-2.

The subcarriers 8 are the same (same carrier frequency f) for all OFDM symbols 6. For example, each OFDM symbol 6 comprises first and second subcarriers C1 and C2 of a first and second frequency f1 and f2, respectively. As can be seen from FIG. 7, the four output symbols S1, −S2*, S2, S1* generated from the two input symbols S1 and S2 are carried by the same subcarrier C1. This ensures an efficient use of resources for the adaptive OFDM system because corresponding subcarriers 8 (i.e. subcarriers 8 with the same carrier frequency f) on the transmit paths T1, T2 and corresponding subcarriers 8 of the data symbol periods n and n+d will have a comparable channel quality most of the time and, therefore, no or little resource is wasted by using the same constellation for a given subcarrier 8 in all four OFDM data symbols 6-2.

In the same way and with the same benefits, the four output symbols S3, −S4*, S4, S3* generated from the two input symbols S3 and S4 are carried by the same subcarrier C2 in all four OFDM data symbols 6-2. Further output symbols are carried by further subcarriers 8 in the described way.

Returning to FIG. 6. Each interleaver 13 comprises an even/odd selector 14, a delay 16 and a merger 18. The operation of these elements is the same for both signal paths. In the following, the first path is taken as example. The even/odd selector 14-1 receives the output symbols S1, −S2*, S3, −S4* in this order from the Alamouti encoder 12, transmits the symbols at an odd position (i.e. S1, S3, . . . ) to the merger 18-1 and transmits the symbols at an even position (i.e. −S2*, −S4*, . . . ) to the delay 16-1. The delay 16-1 stores (delays) the symbols for a time corresponding to d OFDM data symbol periods 7-2 and then transmits the symbols to the merger 18. Thus, the symbols at even position will be delayed by a spread delay corresponding to d OFDM data symbols 6-2 relative to the symbols at odd position. The merger 18 merges the even and the odd position symbols and transmits them to the OFDM modulator 20-1. Hereby, the merger 18 orders the symbols so that the symbols S1 and −S2* (i.e. the symbols of the first Alamouti input pair) are mapped to the first subcarrier C1 of the n-th and the (n+d)-th OFDM data symbol period 6-2 and the symbols S3 and −S4* (i.e. the symbols of the second Alamouti input pair) are mapped to the second subcarrier C2 of the n-th and the (n+d)-th OFDM data symbol period 6-2. Generally, the symbols of a k-th input pair are mapped to a k-th subcarrier 8. As shown in FIG. 6, the k-th and the (k+1)-th subcarrier 8 are neighbored (i.e. there is no subcarrier 8 with a frequency f which is between the frequency f of the k-th subcarrier 8 and the frequency of the (k+1)-th subcarrier 8). Frequency interleaved subcarriers 8 are possible, however (i.e. there are one or more subcarriers 8 with frequencies f which are between the frequency f of the k-th subcarrier 8 and the frequency f of the (k+1)-th subcarrier 8).

A number of subcarriers 8 of each OFDM data symbol 6-2 correspond to pilot carriers, that is, they carry a symbol (pilot symbol) known to the receiver 2 (channel estimator 32). The number of pilot carriers depends on the overall system architecture. Pilot carriers are typically distributed equally over the available frequency range (e.g. every tenth to twentieth subcarrier 8). Initially, the receiver 2 (channel estimator 32) estimates the channel characteristics with the help of the training symbols 6-1 at the beginning of an OFDM burst 5. The pilot carriers in a given OFDM data symbol 6-2 are used by the channel estimator 32 to verify if the channel estimation is still valid for the given OFDM data symbol 6-2 and are used to readjust the channel equalization values.

The OFDM modulator 20-1 performs OFDM modulation as is known in the state of the art and transmits the symbols S1, S3, . . . (i.e. the odd ordered symbols) during the OFDM data symbol period n and the symbols −S2*, −S4*, . . . (i.e. the even ordered symbols) during the OFDM data symbol period n+d on the transmit path T1. Likewise, the OFDM modulator 20-2 performs state of the art OFDM modulation and transmits the symbols S2, S4, . . . (i.e. the odd ordered symbols) during the OFDM data symbol period n and the symbols S1*, S3*, . . . (i.e. the even ordered symbols) during the data symbol period n+d on the transmit path T2.

Figure 8:
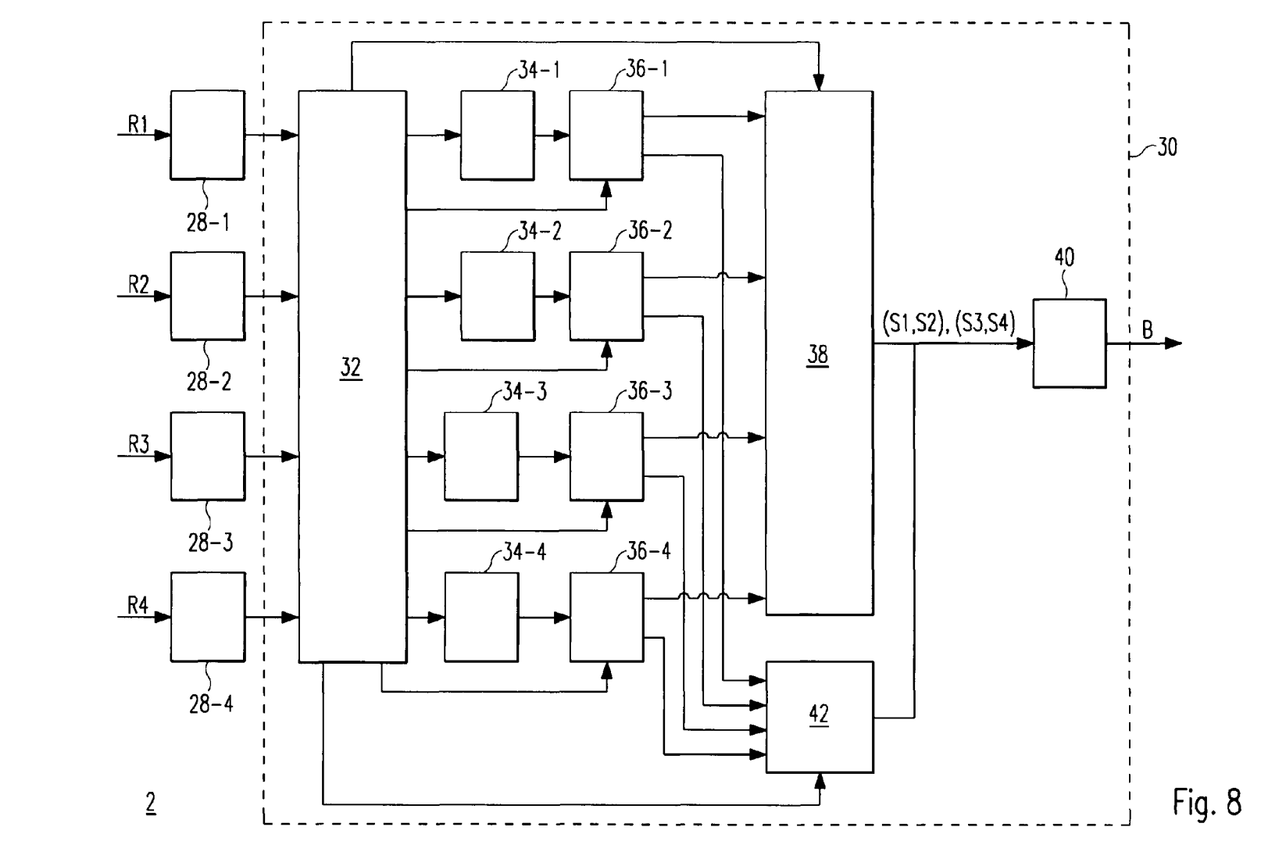
FIG. 8 shows the receiver 2 according to the first embodiment of the present invention.

FIG. 8 shows a block diagram of the receiver 2 having, as an exemplary provision, four receive paths R1, R2, R3, R4. The receiver 2 comprises four OFDM demodulators 28-1, 28-2, 28-3, 28-4, each demodulator 28 connected to a different one of the receive paths R1, R2, R3, R4, for demodulating the OFDM symbols 6 received on the receive paths R1, R2, R3, R4. The receiver 2 further comprises a decoder 30 for decoding the received and demodulated OFDM symbols 6 and outputting the bitstream B. The receiver 2 comprises four parallel and identical signals paths, each signal path connected to a different one of the receive paths R1, R2, R3, R4. Each signal path comprises an OFDM demodulator 28, a channel estimator 32 (common to all signal paths), a deinterleaver 34, an OFDM symbol selector 36, an Alamouti decoder 38 (common to all four signal paths) and an auxiliary decoder 42 (common to all four signal paths). Even if not said explicitly in the following, corresponding elements (e.g. the OFDM demodulators 28-1, 28-2, 28-3, 28-4) in the different signals paths have the same functionality and can thus be considered as equal. Even if not said explicitly in the following, the number of receive paths may vary.

In the following, the first signal path connected to the first receive path R1 is used as an example for explaining the function of the decoder 30. After the OFDM demodulator 28-1 has demodulated an OFDM symbol 6, the demodulated OFDM symbol 6 is inputted to the channel estimator 32. The channel estimator 32 performs state of the art channel estimation based on the training symbols 6-1 received on all receive paths R1, R2, R3, R4 during an OFDM burst 5.

Hereby, the channel estimator 32 obtains a plurality channel equalization values for each subcarrier 8 and a signal to noise ratio (SNR) for each subcarrier 8. The equalization values obtained from the training symbols 6-1 of the OFDM burst 5 are termed a set of equalization values. The set of equalization values is used for decoding the following data symbols 6-2 of the OFDM burst 5 and, additionally, are stored for later reference in a memory means (not shown) comprised in the channel estimator 32 (see below for more details). The channel matrix H (as defined in equation 1) can be seen as being a representation of the plurality of equalization values obtained for each subcarrier 8. In other words, the channel estimator 32 obtains a channel matrix H for every subcarrier 8 and OFDM burst 5 based on the OFDM training symbols 6-1 of the OFDM burst 5.

Moreover, the channel estimator 32 evaluates the pilot carriers of each OFDM data symbol 6-2. Hereby, the channel estimator 32 determines if the states of the pilot carriers of a current OFDM data symbol 6-2 as received by the receiver 2 are in accordance with one set of the stored sets of equalization values. This may, for example, be achieved by calculating equalization values from the pilot carriers and compare the calculated equalization values with the stored equalization values. When the calculated equalization values approximately map to corresponding equalization values of one set of the stored sets of equalization values, accordance of the pilot carriers with the respective stored set of equalization values is determined. When no according set of equalization values is found, the current OFDM data symbol 6-2 is considered to be destroyed and will not be used in further decoding.

When the channel estimator 32 receives a second OFDM data symbol 6-2, it determines if the channel conditions have changed significantly between transmission of the received second OFDM data symbol 6-2 and transmission of the corresponding first OFDM data symbol 6-2. This may be achieved, for example, by determining if the set of equalization values determined for the received second data symbol 6-2 is the same (at least approximately) as the equalization values determined for the corresponding first OFDM data symbol 6-2.

The channel estimator 32 transmits the current OFDM data symbol 6-2 received from the first OFDM demodulator 28-1 to the first deinterleaver 34-1. The first deinterleaver 34-1 reorders the data symbols (involving both inter and intra OFDM data symbol 6-2 reordering of data symbols) so as to reverse the operation of the interleavers 13 and transmits the reordered data symbols to the first OFDM symbol selector 36-1. Alternatively, the first interleaver 34-1 (the interleavers 34) may be located in the signal path between the first OFDM demodulator 28-1 (the OFDM demodulators 28) and the channel estimator 32.

The first OFDM symbol selector 36-1 receives control instructions from the channel estimator 32. Hereby, first control instructions cause the OFDM symbol selector 36-1 to select the data symbols of the n-th OFDM data symbol 6-2 only and to transmit the selected symbols to the auxiliary decoder 42. The first control instructions may be issued by the channel estimator 32 in case the (n+d)-th OFDM data symbol 6-2 is destroyed (and the n-th OFDM data symbol 6-2 is not destroyed). Second control instructions cause the OFDM data symbol selector 36-1 to select the data symbols of the n+d-th OFDM data symbol only and to transmit the selected data symbols to the auxiliary decoder 42. The second control instructions may be issued by the channel estimator 32 in case the n-th OFDM data symbol 6-2 is destroyed (and the (n+d)-th OFDM data symbol 6-2 is not destroyed). Third control instructions cause the OFDM symbol selector 36-1 to select the data symbols of the n-th OFDM data symbol 6-2, to select the data symbols of the n+d-th OFDM data symbol 6-2 and to transmit the selected symbols to the auxiliary decoder 42. The third control instructions may be issued by the channel estimator 32 in case the channel conditions have changed significantly (e.g. in case different sets of equalization values have been determined for the two OFDM data symbols 6-2). Fourth control instructions cause the OFDM symbol selector 36-1 to select the data symbols of the n-th OFDM data symbol 6-2 and to select the data symbols of the n+d-th OFDM data symbol 6-2 and transmit the selected symbols to the Alamouti decoder 38. The fourth control instructions may be issued by the channel estimator 32 in case the channel conditions have not changed significantly (e.g. in case the same set of equalization values has been determined for both OFDM data symbols 6-2).

The Alamouti decoder 42 decodes the first input symbols (i.e. S1, S3, . . . ) by an Alamouti decoding process according to $$x_1 = \left(\frac{1}{\sum_{i=1}^{2}\sum_{j=1}^{N}(h_{ij})^2}\right) \cdot \sum_{j=1}^{N}(h_{j,1}^* \cdot r_{j,1} + h_{j,2} \cdot (r_{j,2})^*) \quad (2)$$

and the second input symbols (i.e. S2, S4, . . . ) according to $$x_2 = \left(\frac{1}{\sum_{i=1}^{2}\sum_{j=1}^{N}(h_{ij})^2}\right) \cdot \sum_{j=1}^{N}(h_{j,2}^* \cdot r_{j,1} - h_{j,1} \cdot (r_{j,2})^*), \quad (3)$$

whereby the $h_{i,j}$ are the elements of the channel matrix H of the subcarrier 8 carrying the four output symbols of the Alamouti encoder 12, $r_{j,1}$ is the symbol carried by the subcarrier 8 on the receive path j during the n-th OFDM data symbol period 7-2, $r_{j,2}$ is the symbol carried by the subcarrier 8 on the receive path j during the (n+d)-th OFDM data symbol period 7-2 and N, which is the number of receive paths(e.g. four), and transmits the decoded symbols S1, S2, S3, S4 to the QAM demodulator 40. The Alamouti decoder receives the channel matrix H (or equivalent information) employed for decoding from the channel estimator 32. The channel matrices H of the n-th and the (n+d)-th OFDM data symbol period 6-2 are (approximately) the same (for a given subcarrier 8) in case that the channel estimator 32 decides that the decoding is to be performed by the Alamouti decoder 38 (i.e. in case of fourth control instructions). Thus, the channel matrix H received from the channel estimator 32 may, for example, be given by the channel matrix H (set of equalization values) obtained for the n-th OFDM data symbol period 7-2, the channel matrix H (set of equalization values) obtained for the (n+d)-th OFDM data symbol period 7-2 or a combination (mean value) thereof.

Operation of the auxiliary decoder 42 will now be explained. The channel matrix H is defined by $$\begin{pmatrix} r_1 \\ r_2 \\ r_3 \\ r_4 \end{pmatrix} = H \cdot \begin{pmatrix} \tilde{x}_1 \\ \tilde{x}_2 \end{pmatrix}, \quad (4)$$

whereby $r_j$ is the symbol carried by a given subcarrier 8 on the receive path j during a given OFDM data symbol period 7-2, $\tilde{x}_1$ is the symbol transmitted on the first transmit path T1 by the given subcarrier 8 during the given OFDM data symbol period 7-2 and $\tilde{x}_2$ is the symbol transmitted on the second transmit path T2 by the given subcarrier 8 during the given OFDM data symbol period 7-2. Thus, in order to decode the symbols carried by the subcarrier 8, the auxiliary decoder 42 calculates $$\begin{pmatrix} \tilde{x}_1 \\ \tilde{x}_2 \end{pmatrix} = H^{-1} \cdot \begin{pmatrix} r_1 \\ r_2 \\ r_3 \\ r_4 \end{pmatrix}, \quad (5)$$

whereby $H^{-1}$ is a generalized or pseudo inverse of the channel matrix H. The auxiliary decoder 42 receives the channel matrix H (or equivalent information) from the channel estimator 32. The auxiliary decoder 42 may either explicitly calculate $H^{-1}$ from H and then calculate $\tilde{x}_1$, $\tilde{x}_2$ on the basis of $H^{-1}$ or the auxiliary decoder 42 may calculate $\tilde{x}_1$, $\tilde{x}_2$ on the basis of H without explicitly calculating $H^{-1}$. State of the art zero forcing (ZF) receivers can be used for this decoding step. However, other decoders (e.g. MMSE decoders) than ZF decoders can be employed, too. The auxiliary receiver 42 further receives control information from the channel estimator 32. When the (n+d)-th OFDM data symbol 6-2 has been destroyed (i.e. in case of first control instructions), the channel estimator 32 sends first control information causing the auxiliary decoder 42 to calculate the input symbols according to $$\begin{pmatrix} x_1 \\ x_2 \end{pmatrix} = \begin{pmatrix} \tilde{x}_1 \\ \tilde{x}_2 \end{pmatrix} \quad (6)$$

(this calculation corresponds to a trivial calculation or no calculation at all) and transmits the calculated input symbols $x_1$, $x_2$ to the QAM demodulator 40. When the n-th OFDM data symbol 6-2 has been destroyed (i.e. in case of second control instructions), the channel estimator 32 sends second control information causing the auxiliary decoder 42 to calculate the input symbols according to $$\begin{pmatrix} x_1 \\ x_2 \end{pmatrix} = \begin{pmatrix} \tilde{x}_2^* \\ -\tilde{x}_1^* \end{pmatrix} \quad (7)$$

(which corresponds to a reordering, complex conjugation and sign reversal) and transmits the calculated symbols $x_1$, $x_2$ to the QAM demodulator 40.

When neither of the n-th and the (n+d)-th OFDM data symbol 6-2 has been destroyed but the channel conditions have changed significantly between the n-th and the (n+d)-th OFDM data symbol period 7-2 (i.e. in case of third control instructions), the channel estimator 32 sends third control information causing the auxiliary decoder 42 to calculate the input symbols by a decoding process which—in contrast to the Alamouti decoding process of equations (2) and (3)—does not require constant channel conditions. For example, the auxiliary decoder 42 might calculate the input symbols either according to equations (5) and (6) or according to equations (5) and (7), that is, either based on the n-th or based on the (n+d)-th OFDM data symbol 6-2. As another example, the auxiliary decoder 42 might calculate first estimates according to equations (5) and (6) and second estimates according to equations (5) and (7) and then average the calculated the first and second estimates in order to obtain the input symbols.

The QAM demodulator 40 performs a reverse constellation mapping and generates the bitstream B from the calculated/decoded symbols $x_1$, $x_2$ (i.e. S1, S2, S3, S4 ...)

The transmitter 1 and the receiver 2 may comprise, DACs, ADCs, up-converters, down-converters, filters, amplifiers, synchronization circuits, power supplies, casings and other units known in the art of OFDM transceivers.

The transmitter 1 and the receiver 2 and their respective subunits may be implemented, for example, using hardware, hardwire logic, programmable logic, microprocessors, software, memory means and information processing and storing devices already known in the art or yet unknown.

Operation and advantages of the first embodiment and of the present invention in general will now be explained with reference to FIG. 5. In addition to the structure of an OFDM burst 5, FIG. 5 shows an example of a varying channel impedance I as caused by an impedance modulating device (e.g. the rectifier shown in FIG. 2). During the OFDM symbol periods T1 to D2, the communication channel 4 has a first constant or slowly varying channel impedance I1 and, during the OFDM symbol periods D4 to Db, the communication channel 4 has a second constant or slowly varying channel impedance I2, whereby the channel impedance I changes strongly during the OFDM symbol period D3, by switching from the first channel impedance value I1 to the second channel impedance value I2. Of course, switching of the channel impedance I during the symbol period D3 is only an example and switching of the channel impedance I may also occur during other OFDM symbol periods 7 than the symbol period D3.

If the equalization of the OFDM data symbols D1 to Db were only based on the preceding training symbols T1 to Ta, the OFDM data symbols D1 and D2 would be equalized correctly, the OFDM data symbols D4 to Db after the impedance change, however, could not be equalized properly and would cause a large number of bit errors. The embodiment overcomes this problem, as the receiver 2 is able to dynamically apply different equalizer settings according to channel conditions. Hereby, the receiver 2 makes use of the quasi static channel 4 and bases the equalization of the OFDM data symbols D4 to Db on the stored sets of equalization values from previous OFDM bursts 5. As was explained above, this is achieved in that, for every OFDM data symbol 6-2, the pilot carriers comprised in the OFDM data symbol 6-2 are evaluated and a stored set of equalization values, with which the pilot carriers are in accordance, is selected for equalizing the OFDM data symbol 6-2. This needs sophisticated synchronization and offset calculation techniques for timing and phase offset, which are considered to be out of the scope of the present invention. Even for periodic changes, the receiver 2 manages all different equalizer settings that are needed to decode the OFDM data symbols 6-2 for all available impedance settings (typically two).

Moreover, no data is lost due to the destruction of the OFDM data symbol D3 during which the MIMO channel 4 changes. When the channel estimator 32 detects a destroyed OFDM data symbol 6-2 (e.g. due to a change of the channel impedance, or a noise burst) by means of pilot carrier evaluation, it changes the decoding method used by the decoder 30 and uses only the corresponding redundant OFDM data symbol 6-2. Thus, the link reliability and throughput are increased. It is to be noted that, while the decoding scheme used by the receiver 2 is changed according to the current channel conditions, the encoding scheme used by the transmitter 1 is not affected by this and keeps constant. (The encoding scheme might change for other reasons, however. For example, the spread delay d might vary.)

Figure 9:
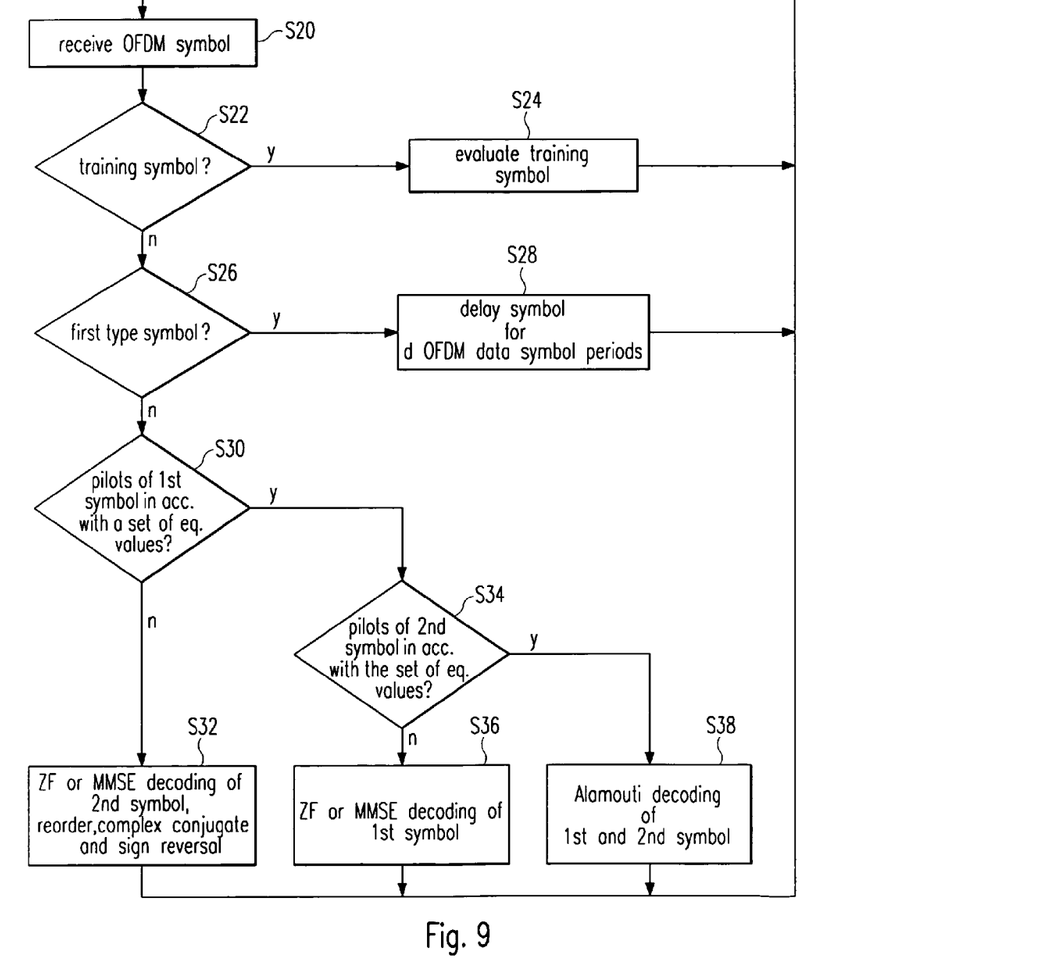
FIG. 9 shows a flow diagram of a process according to the first embodiment of the present invention.

FIG. 9 shows a flow diagram of a process performed by the receiver 2.

In a step S20, a new OFDM symbol 6 is received and the method proceeds to step S22.

In the step S22, it is determined if the received OFDM symbol 6 is a training symbol 6-1. If yes, the method proceeds to a step S24. If no, the methods proceeds to a step S26.

In the step S24, the received training symbol 6-1 is evaluated. When all training symbols 6-1 of an OFDM burst 5 are evaluated, a corresponding set of equalization values is determined and stored. The process returns to step S20.

In the step S26, the received OFDM symbol 6 is an OFDM data symbol 6-2. It is determined if the received OFDM data symbol 6-2 is the first symbol (OFDM symbol of the first type) of a redundant OFDM symbol pair or not. If yes, the process proceeds to a step S28. If no, the process proceeds to a step S30.

In the step S28, the received OFDM symbol data symbol 6-2 is delayed (stored) by the deinterleavers 34 for d OFDM data symbol periods 7-2. The process returns to step S20.

In the step S30, the received OFDM data symbol 6-2 is the second symbol of a redundant OFDM symbol pair. The channel estimator 32 determines if the pilot carriers of the corresponding first OFDM data symbol 6-2 are in accordance with one of the stored sets of equalization values. If yes, the process proceeds to a step S34. If no, the process proceeds to a step S32.

In the step S32, the auxiliary decoder 42 receives an according set of equalization values from the channel estimator 32, and obtains the input symbols (S1, S2, S3, S4, ...) by decoding (e.g. by ZF or MMSE decoding) the received second OFDM data symbol 6-2. Decoding may be obtained, for example, by a calculation according to equation (5) and performing reordering, complex conjugation and sign reversal according to equation (7). The process returns to step S20.

In the step S34, the channel estimator 32 determines if the pilot carriers of the received second OFDM data symbol 6-2 are in accordance with the set of equalization values determined in step S30. If yes, the channel conditions have not changed significantly and the process proceeds to a step S38. If no, the process proceeds to a step S36.

In the step S36, the auxiliary decoder 42 receives an according set of equalization values from the channel estimator 32 and obtains the input symbols (S1, S2, S3, S4, ...) by decoding (e.g. by ZF or MMSE decoding) the corresponding first OFDM data symbol 6-2. Decoding may be obtained, for example, by a calculation according to equation (5). The process returns to step S20.

In the step S38, the Alamouti decoder 38 receives an according set of equalization values from the channel estimator 32 and decodes the input symbols (e.g. S1, S2, S3, S4, ...) from the received second OFDM data symbol 6-2 and the corresponding first OFDM data symbols 6-2 according to equations (2) and (3). The process returns to step S20.

It is clear to the skilled person, that the diagram of FIG. 9 may be modified, augmented, and reordered in a variety of ways without leaving the scope of the present invention. For example, between the steps S30 and S32 the channel estimator 32 might execute a step of determining if the pilot carriers of the received second OFDM data symbol 6-2 are in accordance with any one of the stored sets of equalization values. If no, the channel estimator 32 might produce control information indicating that, the input symbols can not be decoded from the received first and second OFDM data symbols 6-2 and no attempt is made to decode the input symbols. If yes, the process proceeds to step S32 described above and the input symbols are decoded from the second OFDM data symbol 6-2. Similarly, between the steps S34 and S36 the channel estimator 32 might execute a step of determining if the pilot carriers of the received second OFDM data symbol 6-2 are in accordance with any one of the stored sets of equalization values. If yes, neither the first nor the second OFDM data symbol 6-2 has been destroyed but the channel conditions have changed significantly. In this case, the auxiliary decoder 42 can calculate the input symbols from both the first and the second OFDM data symbol 6-2 by a decoding process which—in contrast to the Alamouti decoding process of equations (2) and (3)—does not require constant channel conditions. If no, the process proceeds to step S36 described above and the input symbols are decoded from the first OFDM data symbol 6-2.

The spread delay d may be fixed or variable.

For example, d may be set fixedly to one (d=1). That is, the two symbols of each redundant symbol pair ({S1, S1*} and {S2, −S2*}) are transmitted during two successive OFDM data symbols periods 7-2. By introducing a short delay of one OFDM data symbol period 7-2 only, the negative effects of impedance changes of the PLC MIMO channel 4 are counteracted effectively (as explained above in relation to FIG. 5).

For unidirectional communication systems, the spread delay d is fixed. Broadcast systems, like DVB for example, are unidirectional communication systems. Under the technical and non-technical conditions encountered in terrestrial digital video broadcast, especially in case of the currently developed DVB-T2 standard, a spread delay of d=1 provides minimal delay and optimum decoding efficiency. Real time video broadcast is obtained by a spread delay of d=1. 'Terrestrial' means that both sender and transmitter are located on the earth. Terrestrial DVB systems are RF wireless communication systems. DVB-T2 is a standard for wireless OFDM based broadcast of digital video. Of course, in the case of a terrestrial digital video broadcast system, the communication channel 3 is not assumed to be a PLC channel and the transmitter 1 and receiver 2 are not assumed to be PLC devices (any other restriction connected with the fact that the system 3, at first, was assumed to be a PLC system is too not assumed to be fulfilled). Instead, the transmitter 1 is a terrestrial digital video broadcast transmitter (e.g. a DVB-T2 transmitter) and the receiver 2 is a terrestrial digital video broadcast receiver (e.g. a DVB-T2 receiver).

Figure 10:
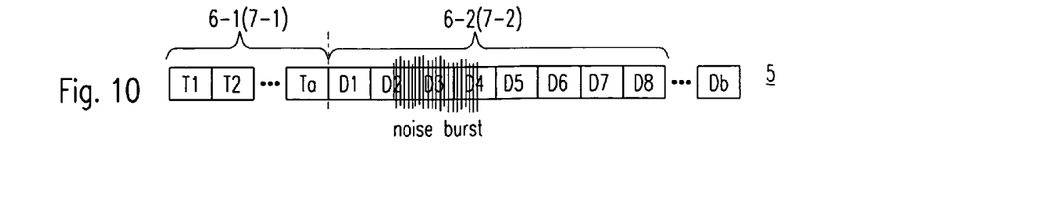
FIG. 10 shows the structure of an OFDM burst and a noise burst.

Generally, the spread delay d is equal or larger than a maximum length of channel disturbances (e.g. noise bursts or impedance changes) on the communication channel 3. The maximum length is given in integer multiples of the transmission period length (e.g. in integer multiples of the OFDM data symbol period 7-2 length). The maximum length is the number of consecutive transmission periods that the channel disturbances can/do affect (e.g. the number of consecutive OFDM symbols that the channel disturbances can/do destroy). The maximum length may be a typical maximum length, in the sense, that channel disturbances of a length which occur only once or occur only very seldom in contrast to other—'typical'—channel disturbances are neglected (i.e. are not taken into account in determining the maximum length). Two methods for determining the maximum length of channel disturbances are proposed. The methods may be refined in various ways and other methods of determining the maximum length are possible. In the first method, destroyed symbols (here, a symbol is the data transmitted during one transmission period length, e.g. an OFDM symbol 6) are detected and a histogram of the numbers of consecutively destroyed symbols is determined. The greatest number of consecutively destroyed symbols is the maximum length of channel disturbances. In case the maximum length is a typical maximum length, numbers of consecutively destroyed symbols which are very seldom compared to other, 'typical', numbers of consecutively destroyed symbols are neglected. In the second method, a length of channel disturbances is measured and a histogram of the lengths of channel disturbances is obtained (the measured length is discrete variable). The maximum length of channel disturbances is obtained by rounding up the length of the longest channel disturbance (when given units of the transmission period length) to the next higher integer value. In case the maximum length is a typical maximum length, lengths of channel disturbances which are very seldom compared to other, 'typical' lengths of channel disturbances are neglected. The spread delay d is equal or larger than repeating channel disturbances of a similar length. Thus, while generally proposing d≥1, the present invention, in one aspect, proposes to use a spread delay d≥2. For example, when d≥3 is chosen, noise bursts destroying three consecutive OFDM data symbols (e.g. D2, D3, D4 as is depicted in FIG. 10) do not harm the data entirely and the input symbols can be decoded from the corresponding redundant OFDM data symbols 6-2 (e.g. D1, D5, D6). Note that bigger values of d might imply that a pair of redundant OFDM data symbols 6-2 is located in two different OFDM bursts 5.

In order to provide for a variable spread delay d, two schemes are proposed by the present invention.

In the first scheme, the receiver 2 listens to the channel 4. Hereby, the channel estimator 32 measures the length of channel disturbances and determines the required spread delay d. The required spread delay d, for example, is equal or larger than the maximum length of channel disturbances on the communication channel as described above. The required spread delay d is transmitted from the receiver 2 to the transmitter 1. The latter can be realized by a message exchange on higher layers (protocol issue). The transmitter 1 employs a spread delay d as instructed by the receiver 2. The receiver 2 may listen to the channel once or repeatedly. In the latter case, a continuous adaption to the channel conditions is achieved. The receiver 2 may, for example, listen to the channel while the transmitter 1 does not yet start its data transmission or during pauses in the data transmission.

In the second scheme, the transmitter 1 listens to the channel 4. The transmitter 1 comprises a channel estimator (not shown) which measures the length of channel disturbances and determines the required spread delay d. The required spread delay d, for example, is larger than the maximum length of channel disturbances on the communication channel as described above. The transmitter 1 transmits the required spread delay d to the receiver 2 and employs the required spread delay d for encoding. The receiver 2 employs the spread delay d as received from the transmitter 1 for decoding. The transmitter 1 may listen to the channel once or repeatedly. In the latter case, a continuous adaption to the channel conditions is achieved.

In a second embodiment, non adaptive OFDM is used (i.e. the same constellation is used on all subcarriers 8 at all times) instead of adaptive OFDM. In this embodiment, the four Alamouti output symbols (e.g. S1, S2, S1*, −S2*) are transmitted using different subcarriers 8. Hereby, for transmission of the redundant symbol pair S1 and S1* two different subcarriers 8 are used and for transmission of the redundant symbol pair S2 and −S2* two different subcarriers 8 are used. Additionally, every one of the four Alamouti output symbols S1, S2, S1*, −S2* might be transmitted using a different subcarrier 8. Transmission using different subcarriers 8 may be achieved by inserting a frequency interleaver (not shown)

into each signal path from the mergers 18-1, 18-2 to the OFDM modulators 20-1, 20-2 and a corresponding frequency deinterleaver (not shown) into each signal path from the OFDM demodulators 28-1, 28-2, 28-3, 28-4 to the channel estimator 32. Frequency interleaving results in improved system performance since degradation on specific frequencies (subcarriers 8) is mitigated. Apart from the simplified (non adaptive) OFDM mode, the different usage of the subcarriers 8, the frequency interleavers and deinterleavers, the second embodiment is the same as the first embodiment.

Decoding of the input symbols based on only one of the two redundant (first and second) OFDM data symbols 6-2 has a higher BER (Bit Error Rate) than Alamouti decoding at a given SNR. An additional interleaver (not shown) for interleaving the input data symbols over a plurality of OFDM data symbols 6-2 might be employed to alleviate this. The additional interleaver is located in the signal flow before the MIMO encoding (e.g. before the QAM modulator 10 and/or before the Alamouti encoder 12). A corresponding additional deinterleaver (not shown) reversing the interleaving must be employed in the receiver 2. The additional deinterleaver is located in the signal flow after the MIMO decoding (e.g. after the decoders 38, 42 and/or after the QAM demodulator 40).

The present invention has been explained with reference to specific embodiments. This is by way of explanation only and it will be readily apparent to those skilled in the art, that various modifications may be made without departing from the scope of the following claims. For example, while the present invention has been explained with reference to a wired PLC channel 4, the present invention may also be employed with another wired channel or with a wireless channel (e.g. an RF wireless channel).

The invention claimed is:

1. A transmitter for transmitting on a first transmit path and on a second transmit path, comprising:
an encoder configured to encode two input symbols into four output symbols and compute a spread delay, wherein
a first symbol and a fourth symbol of said four output symbols carry first information and a second symbol and a third symbol of said four output symbols carry second information, said first symbol is transmitted on said first transmit path during a first transmission period,
said second symbol is transmitted on said first transmit path during a second transmission period,
said third symbol is transmitted on said second transmit path during said first transmission period,
said fourth symbol is transmitted on said second transmit path during said second transmission period,
said first and second transmit paths correspond to input paths of a communication channel; and
a selector configured to only delay symbols transmitted in the second transmission period by the computed spread delay, wherein
the computed spread delay is a number of transmission periods between said first transmission period and said second transmission period, and is larger than a maximum length of channel disturbances of the communication channel.

2. A transmitter according to claim 1, wherein said two input symbols are encoded into said four output symbols according to an Alamouti encoding.

3. A transmitter according to claim 1, wherein said first, second, third, and fourth symbols are transmitted on OFDM subcarriers of the same frequency.

4. A transmitter according claim 1, wherein an amount of information that is transmitted on each OFDM subcarrier during one transmission period is varied adaptively according to channel conditions.

5. A transmitter according to claim 1, wherein said first and fourth symbols are transmitted on OFDM subcarriers of different frequencies and said second and third symbols are transmitted on OFDM subcarriers of different frequencies.

6. A transmitter according to claim 5, wherein an amount of information that is transmitted on an OFDM subcarrier during one transmission period is the same for different OFDM symbol periods.

7. A transmitter according to claim 5, wherein an amount of information that is transmitted on an OFDM subcarrier during one transmission period is the same for all subcarriers.

8. A transmitter according to claim 1, wherein the spread delay is variable.

9. A transmitter according to claim 8, wherein the transmitter is adapted to receive information indicating the spread delay to be used from a receiver of the output symbols.

10. A transmitter according to claim 8, further comprising:
a channel estimator adapted to determine the maximum length of the channel disturbances.

11. A transmitter according to claim 1, wherein the spread delay is at least two symbol transmission periods.

12. A transmitter according to claim 1, wherein the transmitter is a terrestrial DVB transmitter and the spread delay is one symbol transmission period.

13. The transmitter of claim 1, wherein the symbols transmitted in the second transmission period are symbols located at even positions in the sequence of symbols encoded by the encoder.

14. The transmitter of claim 1, wherein the selector transmits the symbols at odd positions in the sequence of four output symbols without delay.

15. The transmitter of claim 1, further comprising:
a merger configured to merge the symbols at the even position in the sequence of four output symbols with the symbols at odd position in the sequence of four output symbols before modulating the output symbols.

16. A receiver for receiving one or more first signals during a first transmission period and for receiving one or more second signals during a second transmission period, the one or more first signals being based on
a first symbol transmitted on a first transmit path during said first transmission period, and
a second symbol transmitted on said first transmit path during said second transmission period,
the one or more second signals being based on
a third symbol transmitted on a second transmit path during said first transmission period, and
a fourth symbol transmitted on said second transmit path during said second transmission period, wherein
said first symbol and said fourth symbol carry first information, said second symbol and said third symbol carry second information,
the first information carried by each of said first and forth symbols corresponds to a first input symbol, and
the second information carried by each of said second and third symbols corresponds to a second input symbol,
the receiver comprising:
a decoder configured to decode the two input symbols based on said one or more first signals, or to decode said two input symbols based on said one or more second signals, wherein only the symbols transmitted in the second transmission period are delayed by a predetermined spread delay.

17. A receiver according to claim 16, wherein said decoder is further configured to decode said two input symbols based on said one or more first signals and said one or more second signals.

18. A receiver according to claim 17, further comprising:
a channel estimator configured to determine if said one or more first signals are transmitted correctly or not and if said one or more second signals are transmitted correctly or not, wherein, in a case that said one or more first signals and said one or more second signals are determined to be transmitted correctly, said decoder decodes said two input symbols based on one of said one or more first signals and said one or more second signals.

19. A receiver according to claim 18, wherein in a case that said one or more second signals are determined to be transmitted incorrectly, said decoder is configured to decode said two input symbols based on said one or more first signals.

20. A receiver according to claim 18, wherein
said first symbol is transmitted as part of a first OFDM symbol,
said second symbol is transmitted as part of a second OFDM symbol,
said third symbol is transmitted as part of a third OFDM symbol,
said fourth symbol is transmitted as part of a fourth OFDM symbol, and
said channel estimator is configured to determine if said one or more first signals are transmitted correctly or not and if said one or more second signals are transmitted correctly or not, based on pilot signals comprised in the OFDM symbols transmitted during said first and second transmission period, respectively.

21. A receiver according to claim 20, wherein said channel estimator is configured to determine if said one or more first signals are transmitted correctly or not and if said one or more second signals are transmitted correctly or not, based on determining if the pilot signals are in accordance with stored equalizer settings.

22. A receiver according to claim 16, wherein the spread delay is a number of transmission periods between said first transmission period and said second transmission period and the spread delay is variable.

23. A receiver according to claim 22, wherein said channel estimator is configured to determine the spread delay that shall be used by a transmitter based on channel conditions.

24. A receiver according to claim 22, configured to receive information indicating the spread delay from a transmitter.

25. A receiver according to claim 16, wherein a spread delay is a number of transmission periods between said first transmission period and said second transmission period and the spread delay is at least two symbol transmission periods.

26. A receiver according to claim 16, wherein the receiver is a terrestrial DVB receiver, a spread delay is a number of transmission periods between said first transmission period and said second transmission period and said spread delay is one symbol transmission period.

27. A communication system comprising:
at least one transmitter transmitting on a first transmit path and on a second transmit path, including:
an encoder configured to encode two input symbols into four output symbols and compute a spread delay, wherein
a first symbol and a fourth symbol of said four output symbols carry first information and a second symbol and a third symbol of said four output symbols carry first information,
said first symbol is transmitted on said first transmit path during a first transmission period,
said second symbol is transmitted on said first transmit path during a second transmission period,
said third symbol is transmitted on said second transmit path during a said first transmission period,
said fourth symbol is transmitted on said second transmit path during said second transmission period,
said first and second transmit paths correspond to input paths of a communication channel,
a selector configured to only delay symbols transmitted in the second transmission period by the computed spread delay, wherein the computed spread delay is a number of transmission periods between said first transmission period and said second transmission period, and is larger than a maximum length of channel disturbances of the communication channel; and
at least one receiver receiving one or more first signals during a first transmission period and receiving one or more second signals during a second transmission period, the one or more first signals being based on
a first symbol transmitted on a first transmit path during said first transmission period and
a second symbol transmitted on said first transmit path during said second transmission period,
the one or more second signals being based on
a third symbol transmitted on a second transmit path during said first transmission period, and
a fourth symbol transmitted on said second transmit path during said second transmission period, wherein
said first symbol and said fourth symbol carry the first information,
said second symbol and said third symbol carry the second information,
the first information carried by each of said first and forth symbols corresponds to a first input symbol, and
the second information carried by each of said second and third symbols corresponds to a second input symbol,
the receiver including
a decoder configured to decode the two input symbols based on said one or more first signals, or to decode said two input symbols based on said one or more second signals, wherein only the symbols transmitted in the second transmission period are delayed by the computed spread delay.

28. A method of transmitting data from a transmitter to a receiver connected by a communication channel, comprising:
encoding two input symbols into four output symbols, wherein a first symbol and a fourth symbol of the four output symbols carry first information and a second symbol and a third symbol of said four output symbols carry second information;
delaying only symbols transmitted in a second transmission period by a computed spread delay;
transmitting said first symbol on a first input path of said communication channel during a first transmission period;
transmitting said second symbol on the first input path of said communication channel during the second transmission period;
transmitting said third symbol on said second input path during the first transmission period;
transmitting said fourth symbol on said second input path during said second transmission period;
receiving one or more first signals during said first transmission period and one or more second signals during said second transmission period on one or more output paths of said communication channel; and decoding said two input symbols based on said one or more first signals, or decoding said two input symbols based on said one or more second signals.

* * * * *